United States Patent [19]
Scheer

[11] Patent Number: 5,085,307
[45] Date of Patent: Feb. 4, 1992

[54] CLUTCH DISC

[75] Inventor: Erich Scheer, Prosselsheim, Fed. Rep. of Germany

[73] Assignee: Fichtel & Sachs AG, Schweinfurt, Fed. Rep. of Germany

[21] Appl. No.: 674,561

[22] Filed: Mar. 25, 1991

[30] Foreign Application Priority Data

Apr. 2, 1990 [DE] Fed. Rep. of Germany ....... 4010543

[51] Int. Cl.⁵ ..................... F16D 69/04; F16D 13/38
[52] U.S. Cl. .......................... 192/107 C; 192/107 R; 192/107 M
[58] Field of Search .......... 192/107 C, 107 R, 107 M

[56] References Cited

U.S. PATENT DOCUMENTS

| | | | |
|---|---|---|---|
| 1,858,312 | 5/1932 | Spase | 192/107 C |
| 2,037,928 | 4/1936 | Saks | 192/107 C |
| 2,448,879 | 9/1948 | Gamble | 192/107 C |
| 2,448,880 | 9/1948 | Gamble | 192/107 C |
| 4,291,794 | 9/1981 | Bauer | 192/107 M |
| 4,714,148 | 11/1987 | Alas et al. | 192/107 C |

FOREIGN PATENT DOCUMENTS

| | | |
|---|---|---|
| 0166640 | 1/1986 | European Pat. Off. |
| 1233669 | 2/1967 | Fed. Rep. of Germany . |
| 2641379 | 6/1977 | Fed. Rep. of Germany . |
| 3631863 | 3/1988 | Fed. Rep. of Germany ... 192/107 C |
| 533897 | 2/1941 | United Kingdom . |
| 1235826 | 6/1971 | United Kingdom . |
| 1241756 | 8/1971 | United Kingdom ............ 192/107 C |

Primary Examiner—Leslie A. Braun
Assistant Examiner—Andrea Pitts
Attorney, Agent, or Firm—Toren, McGeady & Associates

[57] ABSTRACT

The invention relates to the construction of friction rings for clutch discs which peripherally have a substantially uniform material thickness and, in the region of the riveting, have groove-shaped, substantially radially extending indentations which are open to the front side, project on the rear side and rest on the wave crests of the lining carriers.

6 Claims, 2 Drawing Sheets

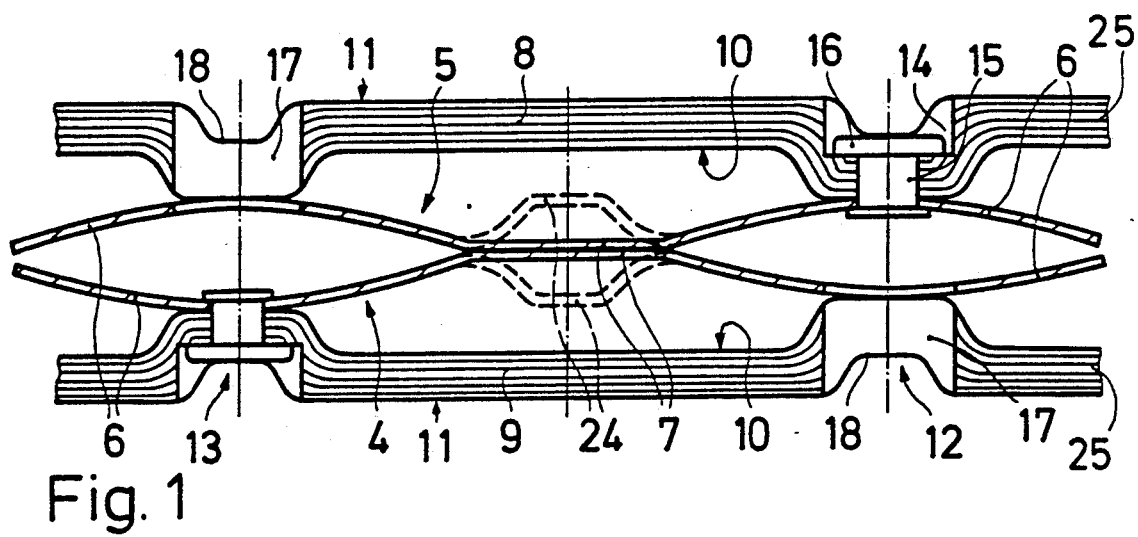
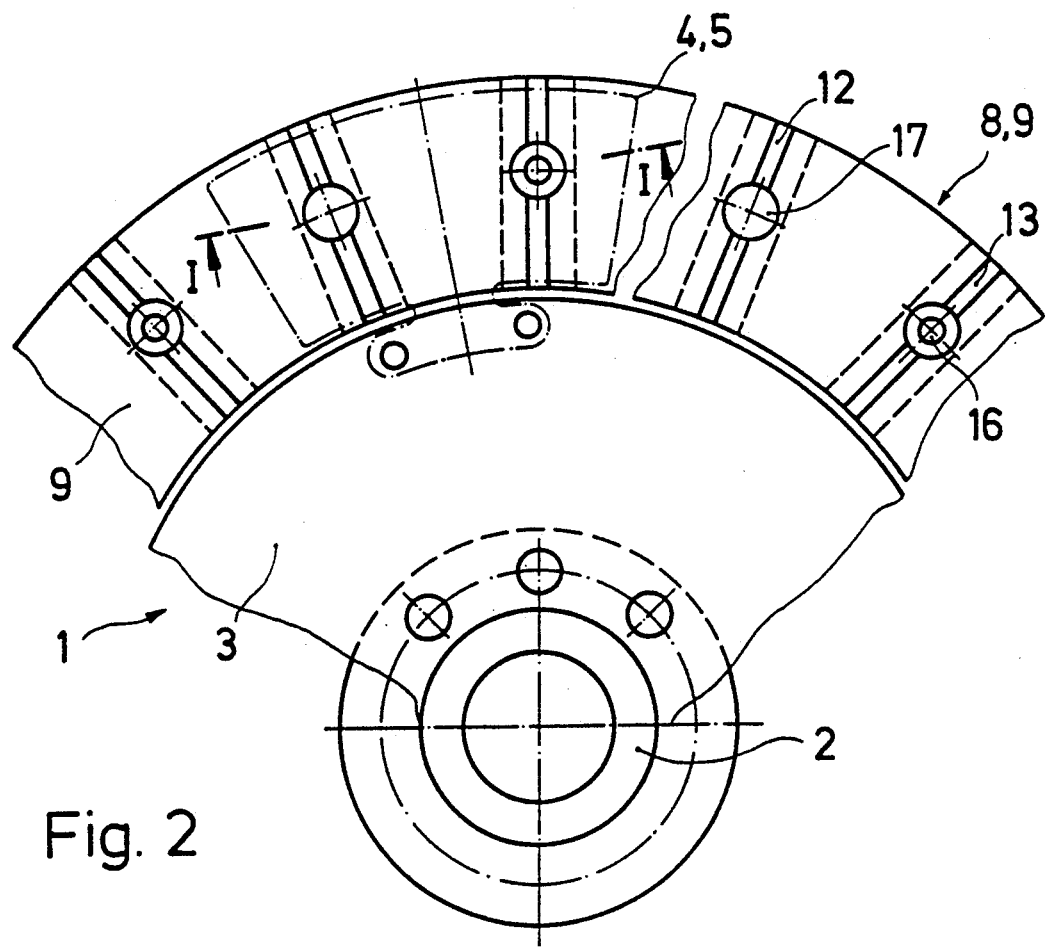

CLUTCH DISC

BACKGROUND OF THE INVENTION

The invention relates to a clutch disc for motor vehicle friction clutches.

Clutch discs with resilient friction lining carriers are known, for example, from DE-AS 1 233 669 and 2 641 379. DE-AS 1 233 669 shows conventional friction rings which are riveted with axial pre-tension on double-sidedly arranged lining carriers. DE-AS 2 641 379 shows lining carriers which are arranged on one side and are also riveted to the friction rings. In both cases, only a small volume of the friction rings is provided as wear material as the clutch disc has to be renewed at the latest when the rivet heads of the lining rivets issue from the surface of the friction rings. Accordingly, the friction material for the friction rings is by far the most expensive individual component of a complete clutch disc. Furthermore, modern friction rings consist, among other things, of strands of fibres which are wound in an encircling manner and, as far as possible, should have no interruptions. This construction allows, for example, high consistency of speed.

SUMMARY OF THE INVENTION

It is an object of the invention to provide a clutch disc with a friction lining arrangement which, on the one hand, is particularly inexpensive and, on the other hand, can completely satisfy the strength requirements.

By introducing, in particular, groove-shaped and substantially radially extending bulges or indentations, which consist in each case of a depression on the side remote from the lining carrier and an axially opposing elevation on the other side, into the material of the friction rings, more specifically in the region where they are riveted to the lining carriers, it is possible, on the one hand, optimally to utilise the wear volume as non-wearing material remains essentially only in the region of the indentations and, on the other hand, not to have to interrupt the fibres used for producing the friction rings or to have to interrupt them only insignificantly at a few points.

The recesses for the rivet heads of the lining rivets are arranged deeper substantially by the height of the rivet heads than the base of the indentations. Cutting is necessary only locally and to a very limited extent and, furthermore, non-wearing material, which corresponds substantially to the height of the rivet heads, remains peripherally between the indentations.

In particular, in the presence of only one row of rivets over the radial dimension of the friction rings, it is advantageous additionally to provide an encircling indentation which intersects the substantially radially extending indentations in the region of the lining rivets. This enables the friction rings additionally also to rest peripherally over greater regions. Therefore, the friction rings can be particularly thin in construction in the regions extending between the indentations.

As an additional measure, it may be advantageous if the friction rings each have, in the region of their internal or external edge, a rib which is arranged on the rear side in each case and has the axial dimension of the indentations. Greater surface regions of thin-walled friction material can thus be axially supported at several points and can therefore also axially support the radially external and internal parts of the friction rings.

Instead of the encircling indentation or in addition thereto, it is also possible to provide the lining carriers with non-resilient supporting regions on which the rear sides of the friction rings can rest when the lining carriers are completely compressed. This measure allows the thin friction rings to be supported at many points and therefore optimum utilization of material.

The various features of novelty which characterize the invention are pointed out with particularity in the claims annexed to and forming part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

The invention is described in more detail hereinafter with reference to embodiments.

FIG. 1 shows a sectional view of a clutch disc, viewed along a line I—I from FIG. 2.

FIG. 2 shows a partial view of the clutch disc.

DESCRIPTION OF PREFERRED EMBODIMENTS

Figure 3:
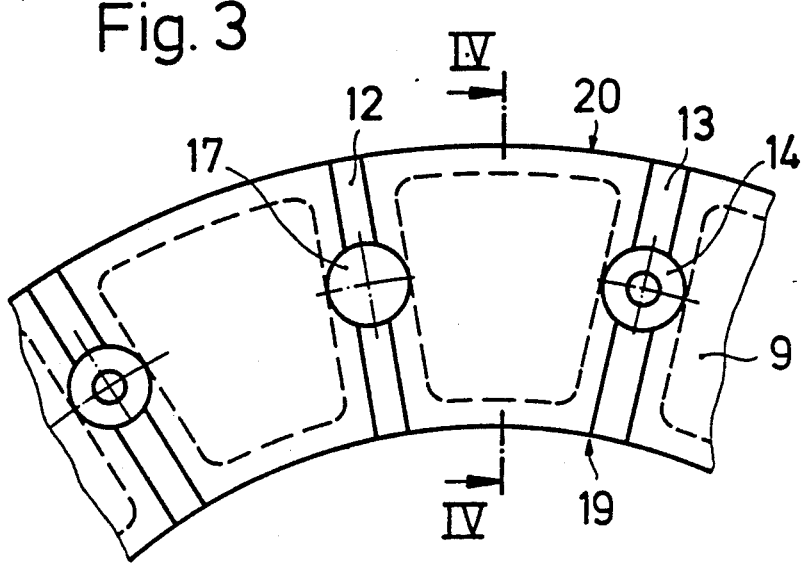
FIG. 3 shows a partial view of the friction ring.

FIG. 2 shows the partial view of a clutch disc 1 with a hub 2 and a hub disc 3 fixed thereon. In a known manner there are arranged, in the region of the external diameter of the hub disc 3, peripherally distributed lining carriers 4 and 5 which, in the present case, are arranged congruently according to the section I—I in FIG. 1, oppose one another and keep the two friction rings 8 and 9 spaced apart with their wave crests 6 in the unloaded state. Wave troughs 7 are arranged in each case between the wave crests 6 and rest on one another. By alternate riveting via lining rivets 15, the friction rings 8 and 9 are each riveted to the corresponding lining carrier 4 or 5 in the region of a wave crest 6. The friction rings 8 and 9 are produced in the conventional manner, for example by winding fibres 25 in strand form into an annular disc and then pressing them together with binder under raised temperature. In the present case, the friction rings are constructed with a very small axial thickness and, in the region of riveting to the lining carriers 4 and 5, are provided with groove-shaped, substantially radially extending bulges or indentations 12, 13 forming elevations which project on the rear sides 10 of the friction rings and, in the region of the wave crests 6, rest thereon. The indentations 12 and 13 are open toward the front side 11 in the axial direction, have openings 17 at the unriveted points and recesses 14 at the rivet points for arrangement of the rivet heads 16 of the lining rivets 15. The indentations 12 and 13 are set back with their base 18 substantially so far from the front side 11 of the friction rings that they do not quite achieve an imaginary extension in the peripheral direction of the rear sides 10. The recesses 14 for the rivets 15 are only constructed sufficiently deeply for the rivet heads 16 to come substantially to the level of the base 18 of the indentations in the axial direction. This arrangement allows the majority of the friction ring material to be utilized as wear volume. It is therefore possible to economise on the very expensive friction material. Shaping of the indentations 12 and 13 during the production process ensures that the strands of fiber used are not interrupted, allowing higher strength of the friction rings to be achieved.

The substantially radially extending indentations 12 and 13 also serve to carry off the rubbed off material and to supply cooling air.

As shown in broken lines in FIG. 1, the lining carriers 4 and 5 can be provided in the peripheral region between the wave crests 6 with supporting regions 24 having an axial height which is such that the friction rings 8 and 9 can rest there with their rear sides 10 in the completely compressed state of the lining carriers. This support allows particularly uniform support of the front sides 11 of the friction rings 8 and 9 relative to the flywheel and the contact pressure plate.

Figure 4:
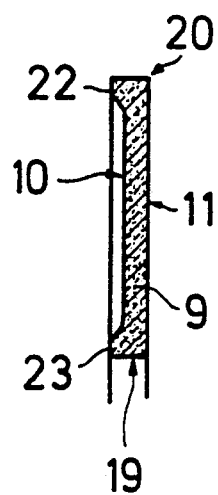
FIG. 4 shows a sectional view of the friction ring, viewed along a line IV—IV from FIG. 3.

FIGS. 3 and 4 show a partial view and section of a variation of the friction rings 8 and 9. The friction ring 9 shown here has, in addition to the substantially radially extending indentations 12 and 13 according to FIGS. 1 and 2, a respective encircling rib 22 and 23 arranged on the rear side 10 in the region of the internal edge and external edge 19, 20. These cross pieces have an axial dimension or height corresponding to that of the indentations 12 and 13. These ribs 22 and 23 enable the friction rings 8 and 9 also to be supported continuously in the region of the external edge or internal edge. This measure allows the friction rings to be even thinner in construction in the regions between the ribs and the indentations.

Figure 5:
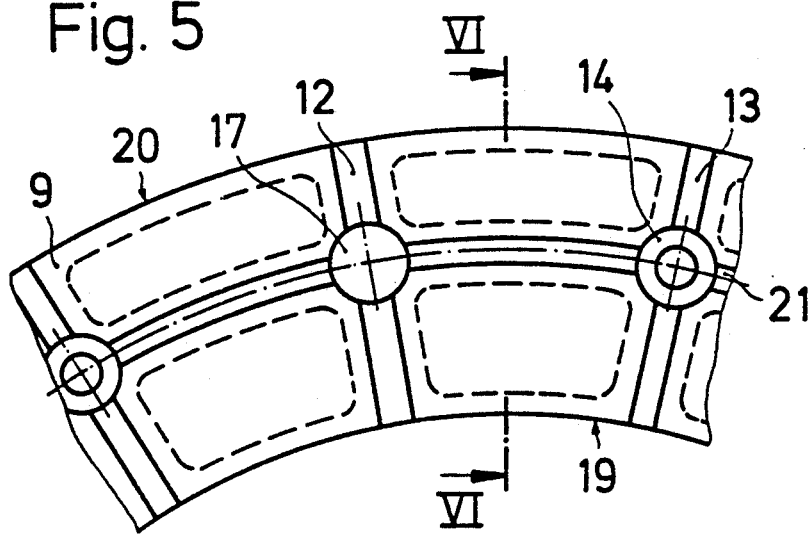
FIG. 5 shows a partial view of a further friction ring.
Figure 6:
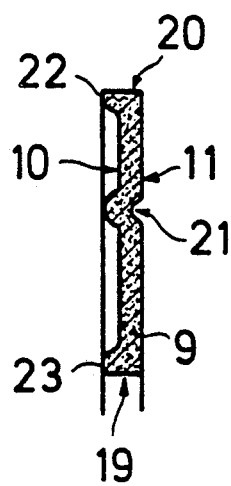
FIG. 6 shows a sectional view of the friction ring, viewed along the line VI—VI from FIG. 5.

FIGS. 5 and 6 show a further variation. In this case, the friction ring 9 is provided with an encircling indentation 21 having the same cross-sectional configuration as the radially extending indentations 12 and 13 in addition to the substantially radially extending indentations 12 and 13 and the peripherally arranged ribs 22 and 23. The encircling indentation 21 intersects the radially extending indentations 12 and 13 in the region of the riveting points in each case, and the openings 17 therefore alternate peripherally with the recesses 14 for arrangement of the lining rivets 15.

In the examples illustrated, an encircling row of rivets is provided in each case for the two opposing friction rings. However, for example two radially superimposed rows of rivets can be provided without further ado.

While specific embodiments of the invention have been shown and described in detail to illustrate the application of the inventive principles, it will be understood that the invention may be embodied otherwise without departing from such principles.

What I claim is:

1. Clutch disc for a motor vehicle friction clutch comprising a hub (2) with a lining carrier arrangement (4, 5) arranged thereon and friction rings (8, 9) in the form of discs, closed into a ring, axially on both sides of the lining carrier arrangement (4, 5), wherein the friction rings (8, 9) are fastened by means of rivets (15) on the lining carrier arrangement (4, 5) and, on their sides axially remote from the lining carrier arrangement (4, 5), have depressions (12, 13) for countersunk reception of heads (16) of the rivets (15), and wherein the friction rings (8, 9) are provided, on their sides axially facing the lining carrier arrangement (4, 5), with elevations which axially oppose the depressions (12, 13), the lining carrier arrangement having at least one axially resilient lining carrier (4, 5) forming wave crests and wave troughs (7) which succeed one another in a peripheral direction, the friction rings (8, 9) resting directly on the wave crest (6) with their elevations formed by bulges (12, 13) of their disc shape and being riveted in a region of the wave crests, the bulges (12, 13) having a groove shape and extending substantially radially.

2. Clutch disc according to claim 1, wherein the heads (16) of the rivets (15) are arranged in dips (14) in the groove-shaped bulges (12, 13) and the dips (14) are sunk deeper, substantially by the height of the rivet heads (16), than base portions of the groove-shaped bulges (12, 13), into the friction rings (8, 9).

3. Clutch disc according to claim 1, wherein the friction rings (8, 9) have, on their sides axially remote from the lining carrier arrangement (4, 5), at least one annularly encircling depression which is formed in the shape of a groove by a bulge (21) of the disc shape of the friction ring and, on the side facing the lining carrier arrangement (4, 5), axially opposes an annularly encircling elevation and wherein the rivets (15) are arranged in a region of points of intersection of the annularly extending bulge (21) and the radially extending bulges (12, 13).

4. Clutch disc according to claim 1, wherein the lining carrier arrangement comprises two lining carriers (4, 5) which, in the peripheral direction, form wave crests (6) and wave troughs (7) and, in the peripheral direction are provided, between the wave crests (6) resting on elevations of the friction rings (8, 9), with non-resilient supporting regions (24) on which the friction rings (8, 9) rest in a completely compressed state.

5. Clutch disc for a motor vehicle friction clutch comprising a hub (2) with a lining carrier arrangement (4, 5) arranged thereon and friction rings (8, 9) in the form of discs, closed into a ring, axially on both sides of the lining carrier arrangement (4, 5), wherein the friction rings (8, 9) are fastened by means of rivets (15) on the lining carrier arrangement (4, 5) and, on their sides axially remote from the lining carrier arrangement (4, 5), have depressions (12, 13) for countersunk reception of heads (16) of the rivets (15), and wherein the friction rings (8, 9) are provided, on their sides axially facing the lining carrier arrangement (4, 5), with elevations which axially oppose the depressions (12, 13), the axially opposing depressions and elevations being formed by bulges (12, 13) of the friction rings (8, 9), and the friction rings (8, 9) having a substantially uniform material thickness over the bulges in a peripheral direction.

6. Clutch disc for a motor vehicle friction clutch comprising a hub (2) with a lining carrier arrangement (4, 5) arranged thereon and friction rings (8, 9) in the form of discs, closed into a ring, axially on both sides of the lining carrier arrangement (4, 5), wherein the friction rings (8, 9) are fastened by means of rivets (15) on the lining carrier arrangement (4, 5) and, on their sides axially remote from the lining carrier arrangement (4, 5), have depressions (12, 13) for countersunk reception of heads (16) of the rivets (15), and wherein the friction rings (8, 9) are provided, on their sides axially facing the lining carrier arrangement (4, 5), with elevations which axially oppose the depressions (12, 13), the friction rings (8, 9) having, in a region of at least one of their internal edge (19) and their external edge (20) on the side axially facing the lining carrier arrangement (4, 5), an annularly encircling rib (22, 23) with an axial height that is substantially equal to an axial height of the elevations.

* * * * *